(12) United States Patent
Choi

(10) Patent No.: US 6,771,320 B2
(45) Date of Patent: Aug. 3, 2004

(54) CONTRAST ENHANCEMENT APPARATUS OF VIDEO SIGNAL

(75) Inventor: Sang Um Choi, Daegu (KR)

(73) Assignee: LG Electronics Inc., Seoul (KR)

( * ) Notice: Subject to any disclaimer, the term of this patent is extended or adjusted under 35 U.S.C. 154(b) by 481 days.

(21) Appl. No.: 09/964,444

(22) Filed: Sep. 28, 2001

(65) Prior Publication Data

US 2002/0039152 A1 Apr. 4, 2002

(30) Foreign Application Priority Data

Sep. 30, 2000 (KR) .................................... 2000-57744

(51) Int. Cl.[7] .............................................. H04N 5/21
(52) U.S. Cl. .................... 348/625; 348/678; 348/687; 348/606; 382/263; 382/274
(58) Field of Search ............................ 348/625, 626, 348/627, 628, 606, 678, 687; 382/254, 260, 263, 264, 274; H04N 5/21, 5/52

(56) References Cited

U.S. PATENT DOCUMENTS

| | | | | |
|---|---|---|---|---|
| 4,780,762 A | | 10/1988 | Nagasaki | 358/166 |
| 5,247,366 A | | 9/1993 | Ginosar et al. | 358/209 |
| 5,343,254 A | | 8/1994 | Wada et al. | 348/627 |
| 5,638,138 A | | 6/1997 | Hickman | 348/678 |
| 5,930,402 A | * | 7/1999 | Kim | 382/274 |
| 6,288,755 B1 | * | 9/2001 | Yun | 348/673 |
| 6,459,458 B1 | * | 10/2002 | Balaban | 348/678 |
| 6,611,627 B1 | * | 8/2003 | LaRossa et al. | 382/240 |

* cited by examiner

Primary Examiner—Michael H. Lee
Assistant Examiner—Trang U. Tran
(74) Attorney, Agent, or Firm—Fleshner & Kim, LLP

(57) ABSTRACT

A contrast enhancement apparatus of a video signal comprises a coefficient generation unit for generating a low frequency mapping coefficient which increases or attenuates the low frequency component of the video signal, a minimum value processing unit for detecting the minimum value of the video signal, an edge detection unit for detecting rapid luminance change in the vertical and horizontal direction, a logarithmic conversion unit for converting logarithm by receiving the inputted video signal, a low-pass filter for passing a low frequency component of the logarithm-converted signal, a high-pass filter for passing a high frequency component of the logarithm-converted signal, a first multiplier for multiplying the low frequency mapping coefficient and a signal which passes low-pass filter, a second multiplier for multiplying the signal passes the high-pass filter by the signal outputted from the edge detection unit, a first adder for adding the signals outputted from the first multiplier and the second multiplier, an exponential conversion unit for converting exponent of the signal outputted from the first adder and a minimum value recovering unit for adding the minimum value of the video signal outputted from the minimum value processing unit thus to provide an improved contrast at real time by generating the low frequency and high frequency mapping coefficients in a proper form according to the intrinsic property, supplying the coefficient to the Homomorphic filter and controlling contrast of a video signal adaptively through first to fifth base signals by a user.

9 Claims, 4 Drawing Sheets

CONTRAST ENHANCEMENT APPARATUS OF VIDEO SIGNAL

BACKGROUND OF THE INVENTION

1. Field of the Invention

The present invention relates to a contrast enhancement apparatus of a video signal and particularly, a contrast enhancement apparatus of a video signal, which performs processing contrast of a video signal at real time.

2. Description of the Background Art

Methods for improving picture quality of a video display apparatus comprise a method for making a user feel sharp by emphasizing the edge boundary and a method for making a user feel sharp by improving light and darkness contrast as a Homomorphic filter.

FIG. 1 is a block diagram showing a conventional contrast enhancement apparatus of a video signal using Homomorphic filter. As shown in the drawing, a contrast enhancement apparatus of a video signal comprises a logarithmic conversion unit 101 for converting a video signal into a logarithm, a wave filter 102 for separating the logarithm-converted video signals into a low frequency component and a high frequency component by the logarithmic conversion unit 101, a first multiplier 103A for attenuating the low frequency component into an attenuation coefficient, a second multiplier 103B for amplifying the high frequency component into an amplification coefficient, an adder 104 for adding the amplified high frequency component by the first multiplier 103A and attenuated low frequency component by the second multiplier 103B and an exponential conversion unit 105 for recovering the adding signal by the adder 104.

FIG. 2 shows a cumulative probability distribution function according to the number of pixels and luminance level of video signals. As shown in the drawing, in case of a dark portion of the video signal as reference numeral A of FIG. 2, the curve of cumulative probability distribution function between the number of pixels and luminance level is higher than a base dotted line. In case of a bright portion of the video signal as reference numeral B of FIG. 2, the curve of cumulative probability distribution function between the number of pixels and luminance level is lower than the base dotted line. In case of a intermediate portion of the video signal as reference numeral C of FIG. 2, the curve of cumulative probability distribution function between the number of pixels and luminance level is similar to the base dotted line. In case of a dark and bright portion of the video signals are mixed, as reference numeral D of FIG. 2, the curve of cumulative probability distribution function between the number of pixels and luminance level is lower or high than the base dotted line.

The conventional art will be described with reference to FIGS. 1 and 2.

A video signal is inputted to the logarithmic conversion unit 101 and the logarithm is converted and the logarithm-converted video signal is inputted to the wave filter 102 thus to be separated into a low frequency component and a high frequency component.

At this time, the first multiplier 103A multiplies an attenuation coefficient to the low frequency component and outputs the low frequency component attenuated as much as A times to improve contrast of the low frequency component. The second multiplier 103B multiplies the high frequency component by the amplification coefficient thus to output the high frequency amplified as much as B times.

The attenuated low frequency component and the amplified high frequency component are added in the adder 104 and the added signal is converted into an exponent through the exponential conversion unit 105 thus to be outputted recovered to an original video signal since the signal is a logarithm-converted signal.

The coefficients A and B are negative or positive according to the light and darkness and the size of the numbers means the degree.

Namely, the Homomorphic filter improves contrast of a video signal by attenuating an low frequency component and amplifying a high frequency component using a fixed amplifying or attenuating coefficient.

However, the conventional Homomorphic filter has a disadvantage that a video signal can not be treated adaptively since the low frequency component is attenuated and the high frequency component is amplified using a fixed coefficient.

Also, with the method of selecting a coefficient differently according to a video signal simply can not perform a real time processing and accordingly, contrast of the video signal can not be improved equally.

Also, the final output video signal should be scaled since the conversion phenomenon of a DC level occurs in case of attenuating the low frequency component and accordingly, a maximum and minimum value of the signal component should be obtained thus to cause a disadvantage in real time processing.

SUMMARY OF THE INVENTION

Therefore, an object of the present invention is to provide a contrast enhancement apparatus of a video signal which can provide an improved contrast at real time by generating the low frequency and high frequency mapping coefficients in a proper value according to the intrinsic property of the video signal, supplying the coefficient to the Homomorphic filter and controlling contrast of a video signal adaptively through first to fifth reference signals by a user.

To achieve these and other advantages and in accordance with the purpose of the present invention, as embodied and broadly described herein, there is provided a contrast enhancement apparatus of a video signal comprising a coefficient generation unit for generating a low frequency mapping coefficient which increases or attenuates the low frequency component of the video signal, an edge detection unit for detecting a rapid luminance changes in the vertical and horizontal direction, a logarithmic conversion unit for converting logarithm by receiving the inputted video signal, a low-pass filter for passing a low frequency component of the logarithm-converted signal, a high-pass filter for passing a high frequency component of the logarithm-converted signal, a first multiplier for multiplying a signal which passes the low frequency mapping coefficient and low-pass filter, a gain correction unit for adjusting the maximum value of the video signal which was increased or attenuated by the first multiplier to be in a certain level receiving the low frequency mapping coefficient outputted from the coefficient generation unit, a second multiplier for multiplying the signal passes the high-pass filter by the signal outputted from the edge detection unit, a first adder for adding the signals outputted from the first multiplier and the gain correction unit, a second adder for adding the signal outputted from the second multiplier and the first adder and an exponential conversion unit for converting an exponent of the signal outputted from the first adder.

The foregoing and other objects, features, aspects and advantages of the present invention will become more

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
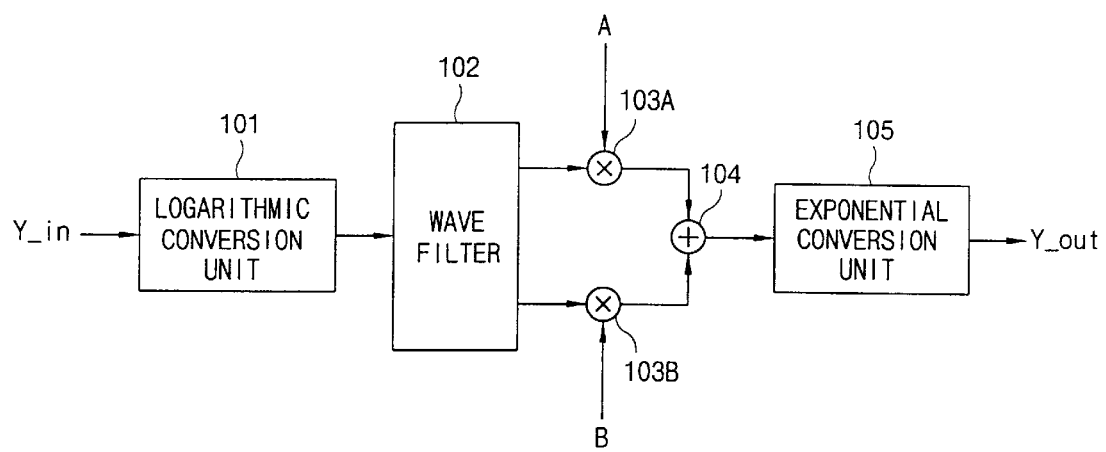
FIG. 1 is a block diagram showing a conventional contrast enhancement apparatus of a video signal using Homomorphic filter.
Figure 2:
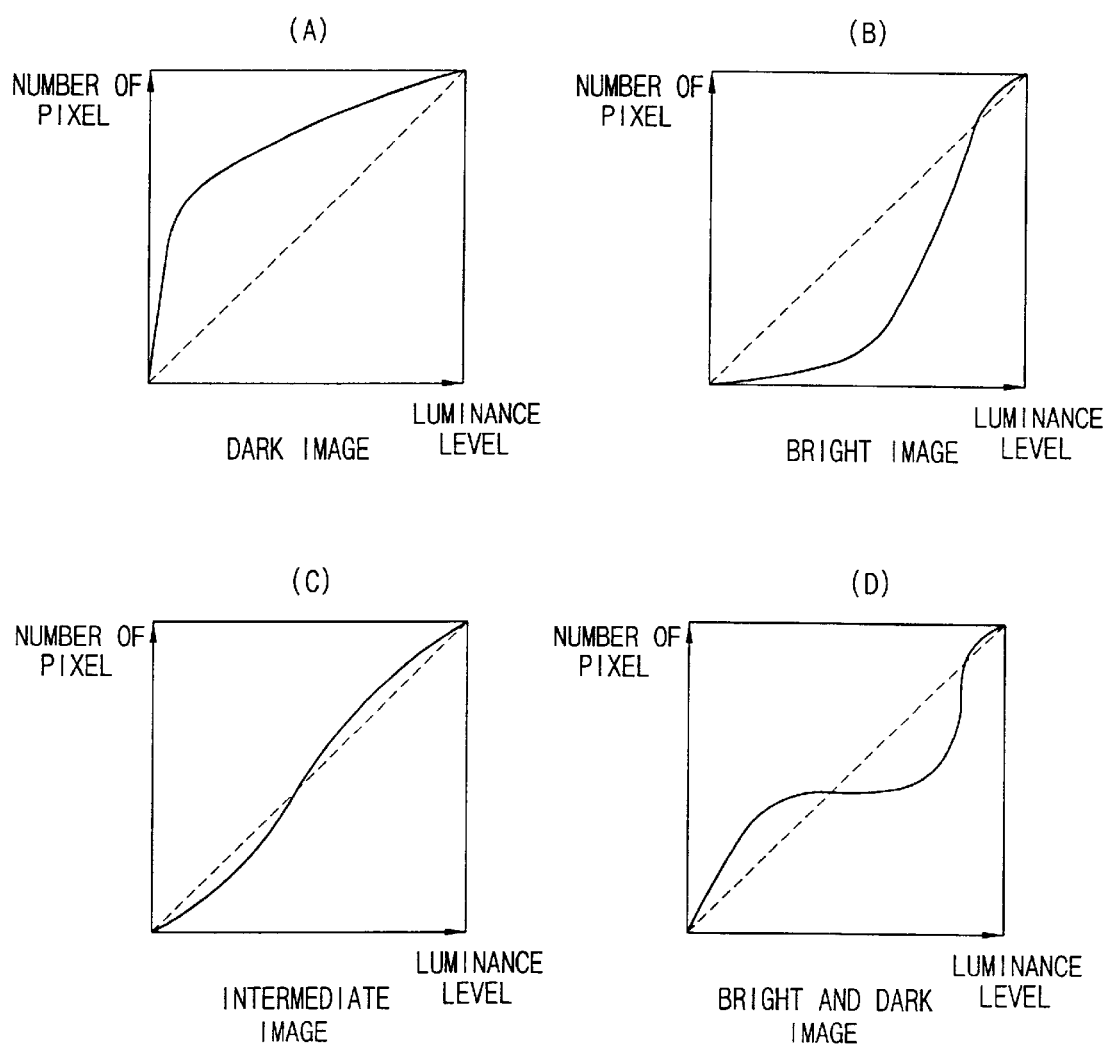
FIG. 2 shows a cumulative probability distribution function according to the number of pixels and luminance level of video signals.
Figure 3:
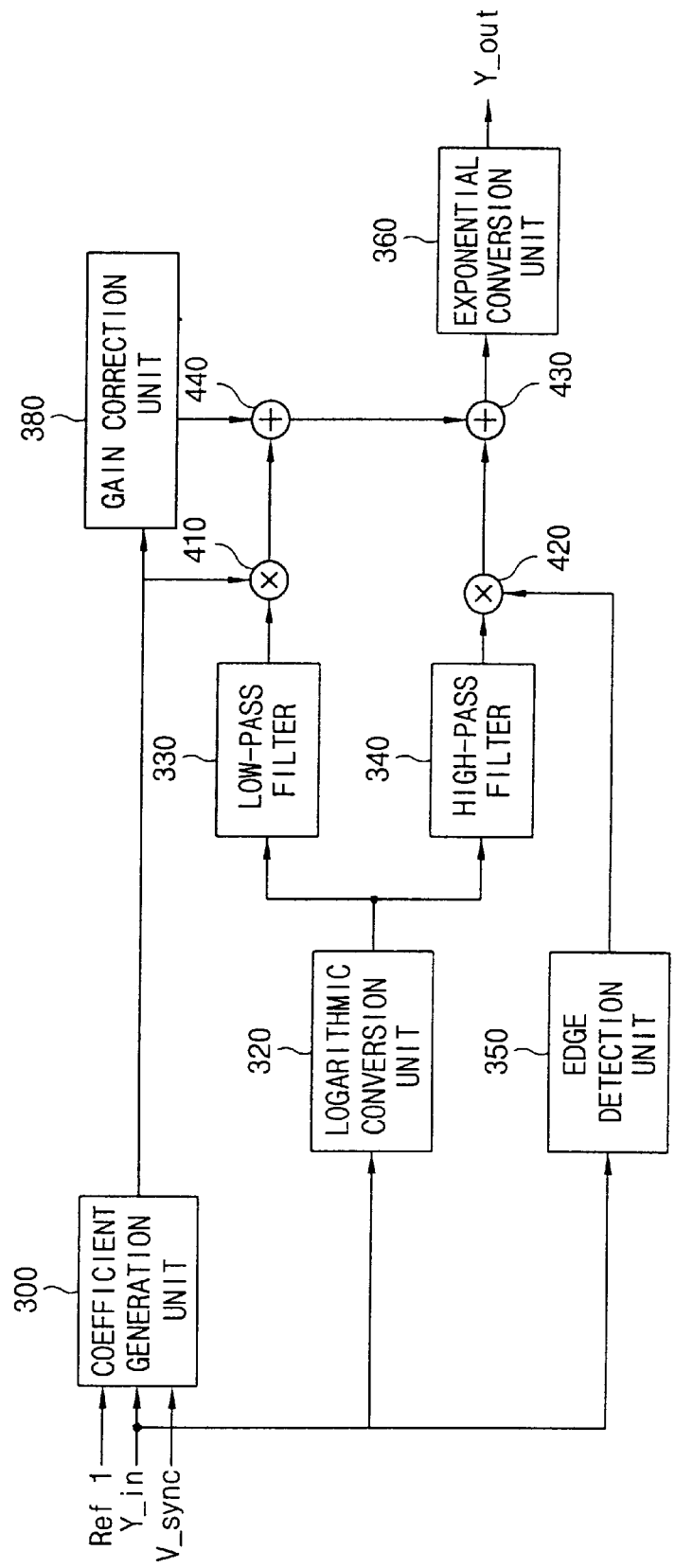
FIG. 3 is a first embodiment showing a contrast enhancement apparatus of a video signal in accordance with the present invention.

FIG. 3 is the first embodiment showing a contrast enhancement apparatus of a video signal in accordance with the present invention. As shown in FIG. 3, the contrast enhancement apparatus of the video signal in accordance with the present invention comprises a coefficient generation unit 300 for generating a low frequency mapping coefficient which attenuates the low frequency component of a video signal Y_in receiving the video signal Y_in, vertical synchronization signal V_sync and the first reference signal Ref 1, an edge detection unit 350 for detecting a luminance change receiving the video signal Y_in, a logarithmic conversion unit for converting logarithm receiving the inputted video signal Y_in, a low-pass filter 330 for passing a low frequency component of the logarithm-converted signal, a high-pass filter 340 for passing a high frequency component of the logarithm-converted signal, a first multiplier 410 for multiplying a signal which passes the low frequency mapping coefficient and low-pass filter, a second multiplier 420 for multiplying the signal passes the high-pass filter by the signal outputted from the edge detection unit, a gain correction unit 380 for correcting the change of the maximum value of the video signal, a first adder 440 for adding the signals outputted from the first multiplier 410 and the gain correction unit 380, a second adder 430 for adding the signal outputted from the second multiplier 420 and the first adder 440 and an exponential conversion unit 360 for converting exponent of the signal outputted from the adder 430.

In the coefficient generation unit 300 generates a low frequency mapping coefficient to emphasize the low frequency components of the video signal Y_in. At this time, the user inputs the first reference signal Ref 1 together with the video signal Y_in. The user can emphasize the dark portion of the video signal Y_in.

The low frequency mapping coefficient is multiplied in the first multiplier 410 together with the signal which passed the low-pass filter 330. If the low frequency mapping coefficient is 0.5, since the signal which passed the low-pass filter 330 and the low frequency mapping coefficient are multiplied at the first multiplier 410, the low frequency components of the video signal which passed the low-pass filter are attenuated or amplified.

The minimum value processing unit 310 detects the minimum value of the video signal Y_in in frames receiving the video signal Y_in and the vertical synchronization signal V_sync, then average the minimum in frames or multiples of the frames, outputs the average value as a minimum value O2 and subtracts the video signal Y_in by the minimum value. The subtracted signal O1 is inputted to the logarithmic conversion unit 320 and the edge detection unit 350. At this time, the minimum value of the video signal Y_in indicates the darkest portion of the video signal Y_in. Therefore, if the video signal Y_in is subtracted by the minimum value, the lowest level of the video signal outputted from the minimum value processing unit 310 is maintained as zero value.

The edge detection unit 350 detects rapid luminance changes of the video signal in the vertical and horizontal direction. At this time, the video signal showing the rapid luminance change is the low frequency component of the video signal.

The logarithmic conversion unit 320 converts the logarithm receiving the signal outputted from the minimum value processing unit 310. The logarithm-converted signal is separated to the video signals of the low frequency and high frequency components passing through the low-pass filter 330 and the high-pass filter 340.

Since the video signal of the low frequency component is multiplied by the low frequency mapping coefficient outputted from the coefficient generation unit 300, the low frequency of the video signal is emphasized or attenuated.

The gain correction unit 380 maintains the maximum value of t the video signal increased or decreased by the first multiplier 410 at a certain level. Namely, the output value of the gain correction unit 380 is used by obtaining with an operational form such as the formula 1.

$$\text{gain correction unit output value} = (\log Y_{max})(1-M_{DC}) \quad \text{formula 1}$$

Here, $Y_{max}$ is the maximum value of video signal and $M_{DC}$ is the low frequency mapping coefficient.

Also, since the video signal of the high frequency component is multiplied by the signal outputted from the edge detection unit 350 at the second multiplier, the high frequency component of the video signal is emphasized or attenuated.

The high frequency component and low frequency component emphasized or attenuated respectively is added at the adder 430 and the added video signal is exponentially converted at the exponential conversion unit 360. The minimum value of the exponent-converted signal is recovered at the minimum value recovering unit 370 and the recovered video signal Y_out is outputted with an improved contrast.

Figure 4:
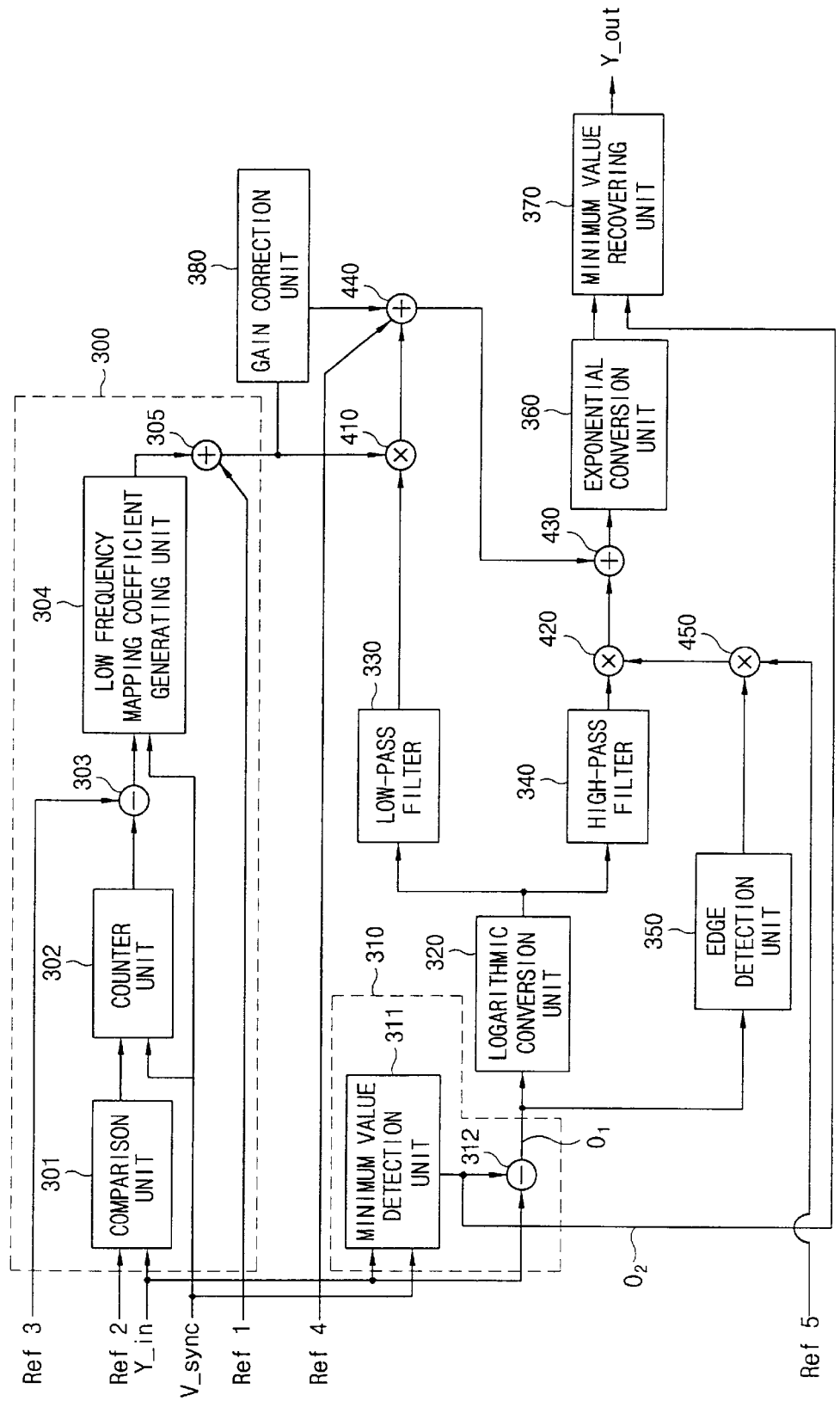
FIG. 4 is a second embodiment showing the contrast enhancement apparatus of a video signal in accordance with the present invention.

FIG. 4 is the second embodiment showing the contrast enhancement apparatus of the video signal in accordance with the present invention. As shown in the drawing, the apparatus comprises the comparison unit 301 for comparing the sizes of the video signal level and the second reference signal, the counter unit 302 for counting number of pixels which are smaller or larger than those of the second reference signal Ref 2 using the vertical synchronization signal V_sync receiving the video signal Y_in and the second reference signal Ref 2, the subtractor 303 for subtracting the value outputted from the counter unit 302 and the third reference signal Ref 3, the low frequency mapping coefficient generation unit 304 for outputting the low frequency mapping coefficient in synchronization with the vertical synchronization signal V_sync, the minimum value detection unit 311 for detecting the minimum value of the video signal Y_in receiving the video signal Y_in and the vertical synchronization signal V_sync, the subtractor 312 for obtaining the difference between the signal outputted from the minimum value detector 311 and the video signal Y_in, the edge detection unit 350 for detecting the change of the luminance receiving the signal outputted from the subtractor 312, the adder 450 for adding the signal outputted from the edge detection unit 350 and the fifth reference signal Ref 5 predetermined by the user, the logarithmic conversion unit 320 for converting the logarithm receiving the signal outputted from the subtractor 312, the low-pass filter 330 for passing the low frequency component of the logarithm-converted signal, the high-pass filter 340 for passing the high frequency component of the signal which was logarithmically converted, the first multiplier 410 for multiplying the signal outputted from the adder 450 by the video signal which passed the high-pass filter, the gain correction unit 380 for correcting the change in the maximum value of the video signal, the exponential conversion unit 360 for exponentially converting the video signal Y_in, the minimum value recovering unit 370 for adding the minimum value of the video signal outputted from the minimum value detection unit 311 and the video signal outputted from the exponential conversion unit 360 to recover the amount which was processed at the minimum value detection unit 311 and the first reference signal Ref 1, fourth reference signal Ref 4 and the fifth reference signal Ref 5 for controlling the contrast of the video signal Y_in at real time. Here, the unexplained reference numerals designate the minimum value detection unit 310 and the adders 305, 430 and 440.

The comparison unit 301 compares the size of each pixel of the video signal Y_in and the level of the second reference signal Ref 2. The counter unit 302 counts the number of the pixels having larger levels than that of the second reference signal Ref 2 after comparing the level of the second reference signal Ref 2 and the size of each pixel of the video signal Y_in synchronization with the vertical synchronization signal Ref 2 at the comparison unit 301.

The subtractor 303 subtracts the third reference signal Ref 3 by the value outputted from the counter unit 302. At this time, since the value outputted from the counter 302 is the different value between the size of the third reference signal Ref 3 and the number of the pixels of the counted video signals on the basis of the third reference signal Ref 3, if the user controls the size of the third reference signal Ref 3, sensitivity of a dark portion or bright portion can be adjusted.

According to the outputted result, the low frequency mapping coefficient value outputted from the low frequency mapping coefficient generation unit 304 fluctuates on the basis of the first reference signal.

The minimum value detection unit 311 detects the minimum value of the video signal Y_in in frames receiving the video signal Y_in and the vertical synchronization signal V_Sync, then average the minimum in frames or multiples of the frames, outputs the average value as a minimum value O2 and subtracts the video signal Y_in by the minimum value at the subtractor 312. The subtracted signal O1 is inputted to the logarithmic conversion unit 320 and the edge detection unit 350. At this time, the minimum value of the video signal Y_in indicates the darkest portion of the video signal Y_in. Therefore, if the video signal Y_in is subtracted by the minimum value, the lowest level of the video signal outputted from the subtractor 312 is maintained as a 0 value.

The edge detection unit 350 detects rapid luminance changes of the video signal in the vertical and horizontal direction. At this time, the video signal showing the rapid luminance change is the high frequency component of the video signal.

The logarithmic conversion unit 320 converts the logarithm receiving the signal outputted from the subtractor 312. The logarithm converted signal is separated to the video signals of the low frequency and high frequency components passing through the low-pass filter 330 and the high-pass filter 340.

Since the video signal Y_in of the low frequency component is multiplied by the low frequency mapping coefficient outputted from the coefficient generation unit 300 at the first multiplier 410, the low frequency of the video signal is emphasized or attenuated.

Also, since the video signal Y_in of the high frequency component is multiplied by the signal outputted from the edge detection unit 350 at the second multiplier 420, the high frequency component of the video signal Y_in is emphasized or attenuated.

The fourth reference signal Ref 4 is added by the low frequency signal outputted from the first multiplier 410 and the low frequency mapping coefficient outputted from the gain correction unit 380. Namely, the user can control the maximum value of the low frequency component of the video signal calculated finally by the fourth reference signal Ref 4.

The fifth reference signal Ref 5 is added by the outputted value outputted from the edge detection unit 350 and accordingly, the user can control the high frequency component of the video signal Y_in directly.

The video signal with the high frequency and low frequency signal emphasized or attenuated is added at the adder 430. The added video signal is exponentially converted at the exponential conversion unit 360. The minimum of the exponent-converted signal is recovered at the minimum value recovering unit 370 and outputted as a video signal Y_out with an improved contrast.

As apparent from above, the contrast enhancement apparatus of the video signal in accordance with the present invention can provide an improved contrast at real time by generating the low frequency and high frequency mapping coefficients in a proper form according to the intrinsic property, supplying the coefficient to the Homomorphic filter and controlling contrast of a video signal adaptively through first to fifth base signals by a user.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A contrast enhancement apparatus of a video signal, comprising:

a coefficient generation unit for generating a low frequency mapping coefficient which increases or attenuates the low frequency component of the video signal;

an edge detection unit for detecting a rapid luminance change in the vertical and horizontal direction;

a logarithmic conversion unit for converting logarithm by receiving the inputted video signal;

a low-pass filter for passing a low frequency component of the logarithm-converted signal;

a high-pass filter for passing a high frequency component of the logarithm-converted signal;

a first multiplier for multiplying the low frequency mapping coefficient and a signal which passes low-pass filter;

a gain correction unit for adjusting the maximum value of the video signal which was increased or attenuated by the first multiplier to be in a certain level receiving the low frequency mapping coefficient outputted from the coefficient generation unit;

a second multiplier for multiplying the signal passes the high-pass filter by the signal outputted from the edge detection unit;

a first adder for adding the signals outputted from the first multiplier and the gain correction unit;

a second adder for adding the signal outputted from the second multiplier and the first adder; and an exponential conversion unit for converting an exponent of the signal outputted from the first adder.

2. The apparatus of claim 1, further comprising;

a minimum value processing unit for detecting the minimum value of the video signal; and a minimum value recovering unit for adding the minimum value of the video signal outputted from the minimum value processing unit.

3. The apparatus of claim 2, wherein the minimum value processing unit further comprises:

a minimum value detecting unit for detecting the minimum value of the video signal by receiving the video signal and vertical synchronization signal; and a subtractor for subtracting the minimum value outputted from the minimum value detecting unit and the video signal.

4. The apparatus of claim 1, wherein the coefficient generation unit comprises:

a comparison unit for comparing the sizes of the video signal level and a second reference signal;

a counter unit for counting number of pixels which are smaller or larger than the second reference signal using the vertical synchronization signal; and a low frequency mapping coefficient generation unit for outputting the low frequency mapping coefficient in synchronization with the vertical synchronization signal.

5. The apparatus of claim 4, wherein the coefficient generation unit, further comprises:

a subtractor for subtracting the value outputted from the counter unit and a third reference signal.

6. The apparatus of claim 4, further comprising:

a first reference signal for controlling the low frequency mapping coefficient by the user; and an adder for adding the first reference signal and the low frequency mapping coefficient outputted from the low frequency mapping coefficient generation unit.

7. The apparatus of claim 1, wherein the outputted value of the gain correction unit is $(\log Y_{max})(1-M_{DC})$ and at this time, $Y_{max}$ is a maximum value of video signal and $M_{DC}$ is a low-pass mapping coefficient.

8. The apparatus of claim 1, wherein the signal outputted from the first multiplier and the value outputted from the gain correction unit are controlled by a fourth reference signal.

9. The apparatus of claim 1, wherein the value outputted from the edge detection unit is controlled by a fifth reference signal.

* * * * *